BINARY DIGITAL SINGLE-BRUSH READOUT DEVICE

Filed April 7, 1959 2 Sheets-Sheet 1

INVENTOR.
ALBERT WOLINSKY

BY [signature]

ATTORNEY.

June 25, 1963 A. WOLINSKY 3,095,559

BINARY DIGITAL SINGLE-BRUSH READOUT DEVICE

Filed April 7, 1959 2 Sheets-Sheet 2

INVENTOR.
ALBERT WOLINSKY

BY H. A. Mackey
ATTORNEY.

3,095,559

BINARY DIGITAL SINGLE-BRUSH READOUT DEVICE

Albert Wolinsky, New Rochelle, N.Y., assignor to General Precision, Inc., a corporation of Delaware Filed Apr. 7, 1959, Ser. No. 804,752
7 Claims. (Cl. 340—347)

Figure 1:
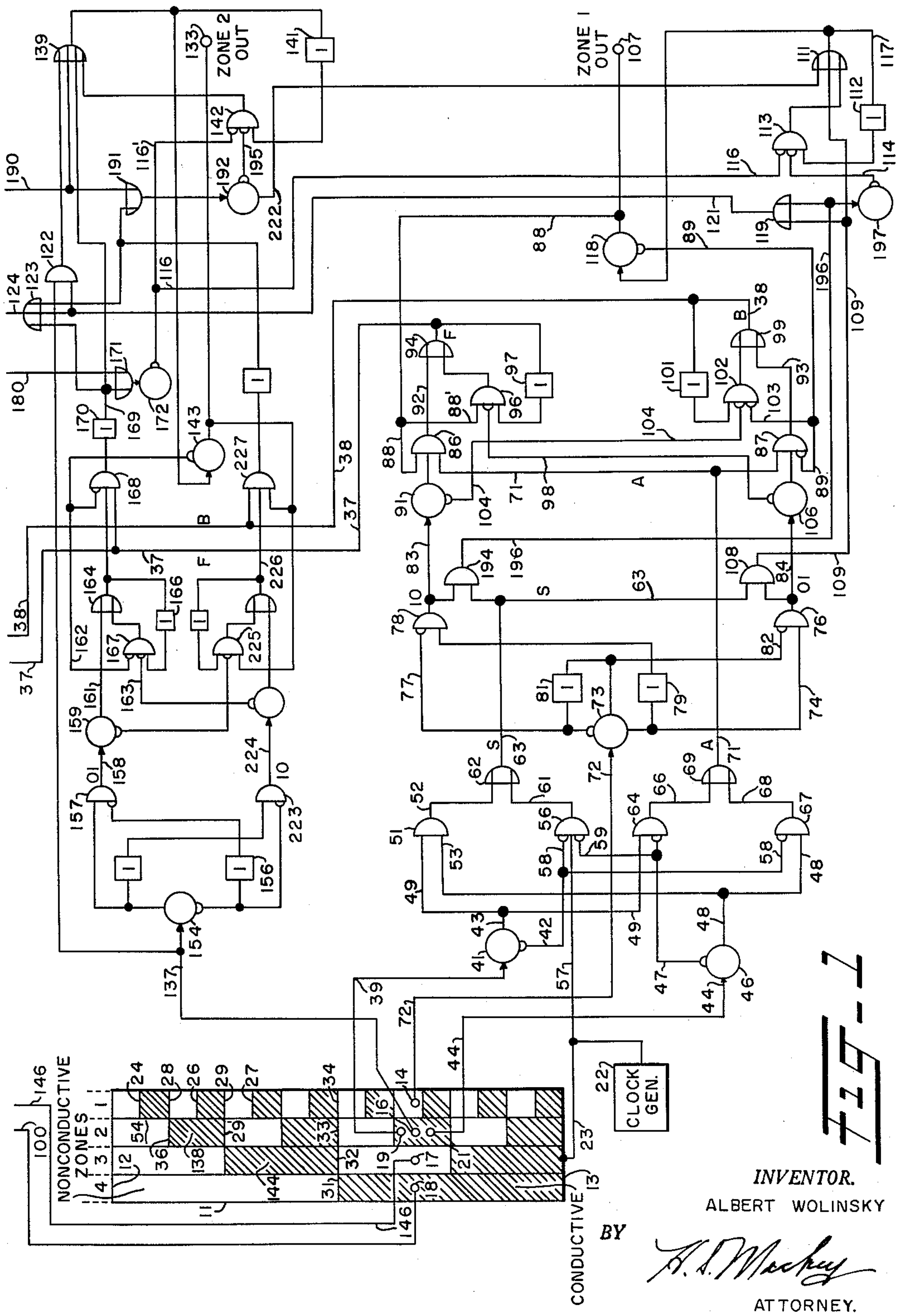

This invention relates to pickup and readout devices for converting analog representations into binary digital code representations and particularly to such devices wherein analog quantities are directly converted into representations in the natural binary digital code.

One of the components of such a converter or translator is commonly termed a code wheel and has the form of a disc inscribed in concentric zones with indicia representing binary digits. The form may, however, be cylindrical and bear the indicia on its circumferential surface. Each zone is divided into equal-length segments of alternate kinds. In the least significant zone the segment lengths are shortest, doubling in each successive higher zone. In each zone the alternate kinds of segments represent marks and spaces, ones and zeros, or some other pair of symbols employed in the number system. The code wheel may represent the two kinds of indicia by segments, alternately electrically conducting and non-conducting, or otherwise.

Each code-wheel zone must be associated with at least one pickup device to sense and distinguish between the two kinds of indicia identifying the segments. For example, the pickup device may comprise a phototube distinguishing between light and dark indicia, or may comprise an electrical brush distinguishing between conducting and non-conducting segments.

An observation of the structure of the natural binary digital code leads to several generalizations which constitute the foundation of this invention. Table 1 presents the first five, 5-digit numerals in this code in successive lines. This invention is applicable, however, to numerals of any number of digits.

TABLE 1

| Value | MSD $2^4$ | $2^3$ | $2^2$ | $2^1$ | LSD $2^0$ |
|---|---|---|---|---|---|
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |

In the left column are the values, in decimal numerals, of the binary numbers. Each column is headed by a power of two designating the digit place or position. These digit places can also be termed the first, second, third, fourth, and fifth, going from right to left, and in a code wheel inscribed to represent this code the corresponding zones can be similarly termed the first, second, third, fourth, and fifth zones. Additionally, the least significant digit, in the right-hand column of the table headed $2^0$, may be abbreviated as LSD, and the left-most or most significant digit in this table, as MSD. Similarly, in a code wheel the least significant zone may be abbreviated as LSZ, and the most significant zone, as MSZ.

When a single pickup device is employed in each zone and all of the pickup devices are arranged to detect changes nominally at the same instant in all zones, there will be ambiguity in each pickup sensing due to the finite width of the pickup area at the boundary line of transition from one kind of segment to the other kind of segment. Additionally, the pickup devices will differ in sensitivity and alignment. Therefore, when continuous parallel readout of signal directly from each of the pickup devices is attempted at a transition, the several readouts do not necessarily register the change simultaneously. This leads to the appearance of extraneous readout signals between successive valid readout signals and is termed ambiguous readout. There is, of course, always ambiguous readout of the least significant zone in the sense that its reading is limited in accuracy by the finite resolving power of the system.

The present invention has for its object the suppression of these extraneous readout signals, thus permitting the use of only a single pickup device for each binary digit. This statement is qualified by the necessity for using more than one brush in one of the zones when a selected and preferred method of sensing motion direction is employed.

The apparatus of this invention includes a natural binary code "wheel" of some form provided with one pickup device in each zone in a straight line perpendicular to the direction of motion of the code wheel relative to the pickup device. Some means of sensing direction of rotation of the code wheel must be provided. If this means be analog in nature it will have the limited accuracy of analog devices; a digital form of sensing device is therefore preferred. The form employed in the described embodiment requires two additional pickup devices in one of the code-wheel zones other than the first zone, and preferably in the second zone. Signals from the pickup devices are applied to a plurality of subcircuits of the kind generally termed logic circuits and containing components such as AND and OR components. These circuits provide output signals which unambiguously represent the code-wheel position in the form commonly termed multiple or parallel readout.

The general purpose of this invention is to provide unambiguous readout in simultaneous natural binary code signals of the position of a natural binary code wheel.

Another purpose is to provide an analog to natural binary digital converter including a code wheel having but a single readout pickup device in each zone.

Another purpose is, to provide an arrangement wherein a pair of signals representing digit changes in the least significant zone and the most significant affected zone determine and enable readout signals from all zones.

Figure 2:
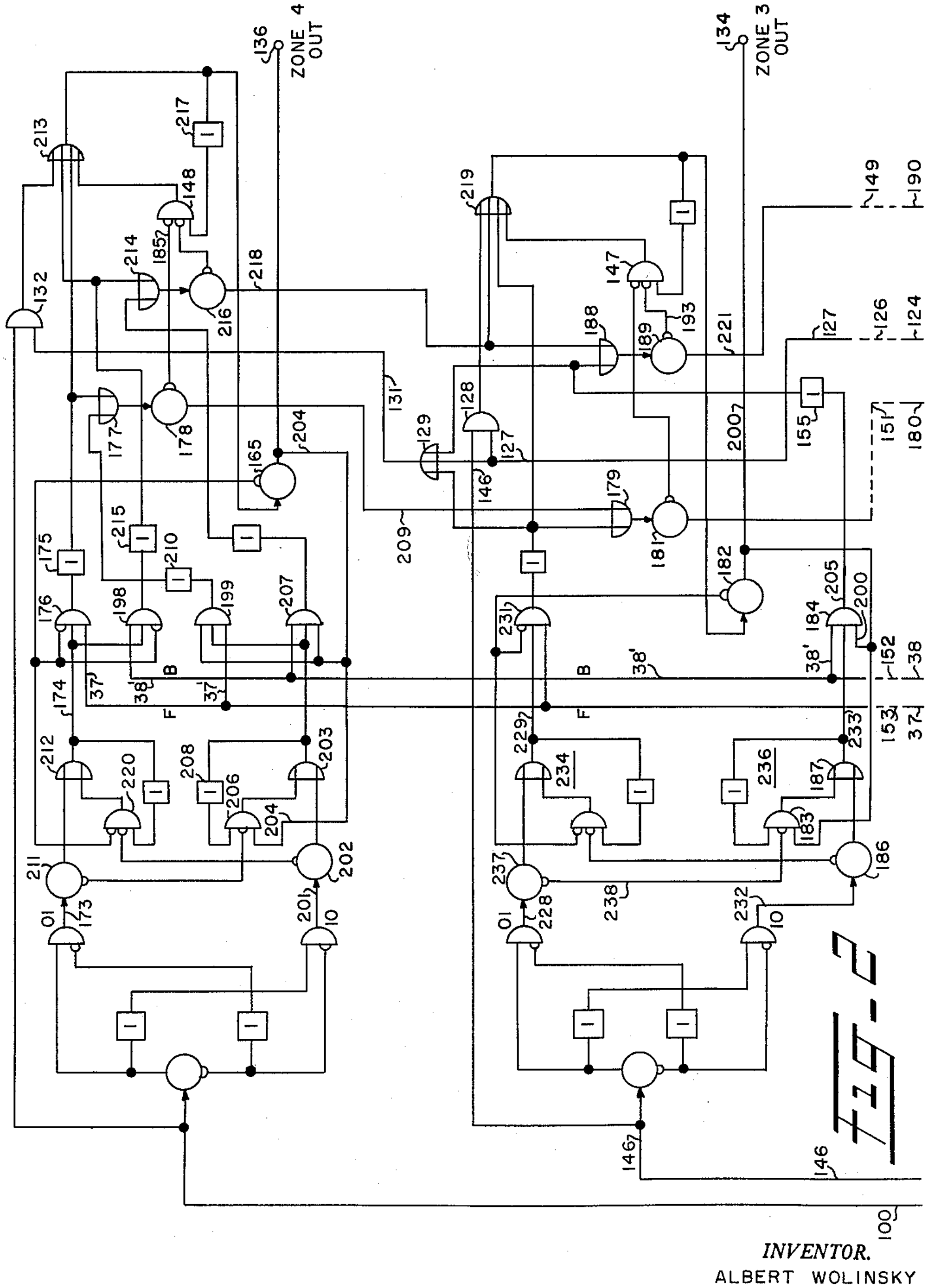

A further understanding of this invention may be secured from the detailed description and drawings, in which:

FIGURES 1 and 2 taken together depict the schematic circuit of an embodiment of the invention.

Referring now to FIG. 1, the pattern 11 represents the developed surface of a code cylinder. This pattern, when placed on the code cylinder, would lie so that its beginning line 12 and ending line 13 would abut each other to form a continuous peripheral surface. The pattern is composed of two kinds of indicia, here illustrated as cross-hatched and white rectangles. The white rectangles represent the digit 0 and the cross-hatched rectangles represent the digit 1. These rectangles, lengthwise of the cylinder, represent binary digital numbers in the natural code. These numbers, from top to bottom of the drawing, have the consecutive values of 0 to 15.

The right column, headed "zone 1," is composed of alternate white and cross-hatched areas, representing insulating and conducting segments respectively, each of unit length. The next column, headed "zone 2," contains alternate white and cross-hatched areas each of 2-unit length. Zone 3 contains alternate areas of 4-unit length and zone 4 contains alternate areas of 8-unit length.

Although but four zones are employed in this example this invention is applicable to a code wheel or interconnected group of code wheels having any number of zones above one and representing digital numbers of two or more digits.

A code wheel or cylinder is designed to revolve under a stationary yoke carrying pickup devices. Pickup brushes 14, 16, 17 and 18 are positioned in a straight line parallel to the code cylinder axis and pick up signals from the respective ones of zones 1 to 4 to produce appropriate readout signals. Two more brushes, 19 and 21, are positioned to bear on zone 2 on either side of brush 16. These two brushes are equidistant from the brush 16 and are separated from each other preferably by a distance less than the length of a zone-2 segment, so that when brush 16 is in the center of a zone-2 segment both brushes 19 and 21 will be wholly on the same segment. More generally, the pair of brushes can be at any equal distances from brush 16 such that when the latter is on a boundary neither brush of the pair touches a boundary. Brushes 19 and 21 have the special function of sensing motion direction and are assisted in this respect by brush 14, which thus has a dual function.

A clock generator 22 continuously generates a train of electrical pulses having a constant frequency which may be, for example, one megacycle per second. The output of this generator or clock is applied through conductor 23 to all of the connected conductive segments of the code cylinder 11.

The surface pattern 11 of the code cylinder may move either forward or backward under its pickup brushes. Forward motion is defined as relative motion of code pattern and brushes in the direction of increasing values of the binary numbers represented by the readout signals. In the depicted 4-zone pattern when the pattern is wrapped around a cylinder, the values, reading down, increase to 15, then, at line 13, suddenly jump to 0. In the backward motion (reading up) the values decrease from 15 to 0, then suddenly jump to 15. In terms of binary numerals, in forward motion the numbers progress by ones from 0000 to 1111, then jump to 0000, while in backward motion they progress from 1111 to 0000, then jump to 1111.

In any zone, when a brush crosses a boundary between two segments the action is termed a transition. When the transition is from an insulating segment to a conducting segment, the signal read out changes from a 0-signal to a 1-signal and the transition is therefore termed a 01 transition. When the change is from a conducting segment to an insulating segment, the signal change is from 1 to 0 and the transition is termed a 10 transition. Since these transitions are employed and necessary in the operation of the device, its operation is consequent upon the transit of a zone 1 boundary. That is, the device requires at least some rotation of the code wheel or cylinder for it to function.

When the code cylinder is in motion, either forward or backward, there are two possible kinds of zone 1 boundary transitions. Transitions at the boundaries 24, 26, 27 and all successive alternate boundaries are never accompanied by transitions in other zones, but transitions at all other zone-1 boundaries, such as 28 and 29, are always accompanied by one or more transitions in one or more higher zones. These boundaries, such as 28 and 29, and consequent transitions and changes, may be termed critical, and the others, non-critical.

One application of this definition of critical transitions is to sense direction of motion by the use of the forward pickup 21 and backward pickup 19. These pickups are so termed because in forward rotation the forward pickup 21 senses a boundary before pickup 19 senses it, while in backward rotation the situation is reversed. At non-critical zone-1 transitions both pickups 19 and 21 are on the same zone-2 segment so that their signals are the same. This is termed the symmetrical (S) condition. On the other hand, during critical zone-1 transitions the zone 2 pickups 19 and 21 straddle a boundary so that their signal outputs are different. This is termed the asymmetrical or antisymmetrical (A) condition. These definitions hold for rotation in either direction.

The following Table 2 summarizes the above definitions.

TABLE 2

| Zone 1 transition | Signals from Zone 2, F and A pickups | |
|---|---|---|
| | Forward rotation | Backward rotation |
| 01 | Symmetrical | Asymmetrical. |
| 10 | Asymmetrical | Symmetrical. |

These characteristics of the zone 1 and 2 boundaries are likewise true of every pair of adjacent zones in any natural binary digital code pattern, so that, instead of using zones 1 and 2 together with pickups 14, 19, and 21 to sense the direction of rotation, any adjacent pair of zones may be employed, the higher being provided with two brushes. However, the use of the two least significant zones is preferred.

During zone-1 critical transitions one or more higher zone transitions occur simultaneously, but in every case, except one to be described latter, the highest of these higher zone transitions is in opposite sense to that of all lower transitions. Thus the transition of the highest or most significant affected zone, being different from the others, may be termed the unique transition and the boundary concerned, the unique boundary.

For example, in forward motion the 4th zone boundary 31 is a 01 boundary which is unique because it differs from the 10 boundaries 32, 33, and 34 of the 3rd, 2nd, and 1st zones. In backward rotation the boundary 31 is again unique, being a 10 boundary while the other three are 01 boundaries. Similarly, coincident with zone 1 boundary 28, the 2nd zone boundary 36 is unique.

Zone-1 non-critical transitions, such as at boundary 26, are not coincident with any other transitions and so it may be said that at these transitions zone 1 is both the least significant zone and the most significant affected zone, and that a transition such as at boundary 26 is a unique transition. As a matter of fact, the circuit behaves in such a way that the definition of unique transition does include these zone 1 non-critical transitions.

In the circuit description which is to follow, it will be shown that some of the signals from the pickups are used immediately while others are stored and still others are discarded. It will also be shown that the initiation of circuit action is always effected by the occurrence of a "unique coincidence." This term is defined as the coincidence of a zone-1 signal change, or of the motion sensing effected thereby, and the signal change caused by a unique transition. It also applies to non-critical zone-1 transitions, in which case the one transition is both a most significant affected zone transition and also a least significant zone transition and the unique coincidence is the coincidence of the transition with itself.

Pickup brushes 14, 19 and 21 are used in conjunction with several logic circuit components to detect the direction of motion of the code cylinder and to generate pulse trains representative of the sense of motion in two conductors, 37 and 38. A train of pulses generated in conductor 37 to indicate that the code cylinder motion is forward constitutes an "F" signal. Alternatively, a train is generated in conductor 38, constituting a "B" signal, to indicate that motion is backward.

The function of brushes 19 and 21 is to aid in sensing direction of motion by emitting signals which are either the same or different, thus indicating whether the brushes 19 and 21 do not or do straddle a zone-2 boundary. Brush 19 is connected through conductor 39 to the input of an inverter amplifier 41, which emits inverted pulse signals at its output terminal 42 and uninverted signals at its output terminal 43. Brush 21 is connected through conductor 44 to the input of another inverter amplifier 46 which emits an inverted output at terminal 47 and uninverted output at terminal 48.

The output terminal 43 of inverter amplifier 41 is connected through conductor 49 to one input of an AND circuit 51. This logical circuit emits a pulse at its output terminal 52 if, and only if, two pulses are coincidentally applied respectively to its input conductors 49 and 53. The output terminal 48 of inverter amplifier 46 is connected through conductor 53 to the other input of AND circuit 51.

When brushes 19 and 21 are both on a conducting segment of zone 2 at the same time they apply the clock train to the two inputs of the AND circuit 51 simultaneously. AND circuit 51 therefore emits a continuous train of clock pulses at its output conductor 52 so long as this brush situation exists. However, when brushes 19 and 21 straddle any zone-2 boundary, only one input is applied to AND circuit 51, and when brushes 19 and 21 are both on an insulating segment, such as segment 54, no input is applied to AND circuit 51. Thus, at any instant the existence of an output in AND circuit output conductor 52 indicates a symmetrical or non-straddle situation of brushes 19 and 21 and also indicates that both brushes are making contact on the same conducting segment of zone 2. These statements are true whether the code cylinder is rotating forward or backward or is stationary.

INHIBIT-AND circuit 56 has one activating input conductor 57 and two inhibiting input conductors 58 and 59. Since, as usually constructed of semiconductor diodes, the inhibiting inputs require the application of inhibiting voltage of reversed polarity, inhibiting inputs are always connected to inverted outputs. Thus, these inhibiting inputs are connected to the inverted pulse outputs 42 and 47 of inverter amplifiers 41 and 46, respectively.

In the operation of any INHIBIT-AND circuit, an output pulse is emitted if, and only if, simultaneous pulses are applied to all activating inputs and no inhibiting pulses are at this instant applied to any of the inhibiting inputs. In the case of the INHIBIT-AND circuit 56, there is only one activating input 57, and that input is connected to the clock generator 22 so that it is energized continuously. The inhibiting input 58 is energized so long as brush 19 is on a conducting segment, and inhibiting input 59 is energized so long as brush 21 is on a conducting segment. Therefore, INHIBIT-AND circuit 56 emits a pulse train at its output conductor 61 continuously while both brushes 19 and 21 are in the non-straddle position on any insulating segment of zone 2, but INHIBIT-AND circuit 56 is inhibited and does not emit any output either when brushes 19 and 21 straddle a boundary or when both brushes are on a conducting segment.

An OR circuit 62 has two inputs derived from conductors 52 and 61 and one output which is impressed on conductor 63. OR circuit 62 emits a pulse at conductor 63 when a pulse is applied to either input 61 or input 52, or when pulses are simultaneously applied to both inputs. When the input or inputs are pulse trains the output is also a pulse train. In this case input pulse trains are applied to the OR circuit 62 whenever brushes 19 and 21 do not straddle a boundary. When the brushes 19 and 21 both emit pulse trains, the OR circuit 62 is energized through AND circuit 51 and emits a signal. When either brush emits a pulse train, the OR circuit 62 is energized through INHIBIT-AND circuit 56 and emits a signal. Thus, the condition for the emission of a pulse train by OR circuit 62 is that either both brushes emit pulse trains or neither does. Therefore, the terms "symmetrical" may be applied to their condition resulting in a pulse train output from circuit 62. Thus the output in conductor 63 may be termed as "S" output, referring to this symmetrical condition.

INHIBIT-AND circuit 64 has one activating input 49 derived from the inverter amplifier 41 and one inhibiting input 47 derived from the inverter amplifier 46. Thus, when brush 19 emits a pulse train while brush 21 does not, a train is emitted by circuit 64 on conductor 66, denoting a straddle situation of brushes 19 and 21.

INHIBIT-AND circuit 67 has one activating input 48 derived from the inverter amplifier 46 and one inhibiting input 58 derived from the inverter amplifier 41. Thus, when the straddle situation of brushes 19 and 21 occurs in which only brush 21 emits a signal, INHIBIT-AND circuit 67 emits an output train on conductor 68.

OR circuit 69 has an input derived from either conductor 66 or conductor 68 during straddle conditions of brushes 19 and 21, so that pulse trains are emitted on conductor 71 during any straddle condition. When brushes 19 and 21 straddle a boundary their outputs are opposite, one output, consisting of a pulse train, representing the binary digit 1, and the other output, consisting of the absence of any pulses, representing the binary digit 0. The brush outputs, being different, may be said to be asymmetric and the output pulse trains from OR circuit 69 may be termed "A" signals.

This description of the generation of S and A signal trains is valid in all conditions of motion of the code cylinder, whether it is turning forward or backward or is stationary.

The zone 1 brush 14 emits a pulse train during its contact with any conducting segment, and emits no train while on any insulating segment. Its output signals are applied through a conductor 72 to an inverter amplifier 73. The inverter amplifier 73 applies activating signals through conductor 74 to INHIBIT-AND circuit 76, and applies inverted inhibiting signals through conductor 77 to INHIBIT-AND circuit 78. The inverter amplifier 73 also applies its uninverted signal output through a delay circuit 79 to the activating input of INHIBIT-AND circuit 78, and applies its inverted signal output through another identical delay circuit 81 to the inhibiting input 82 of INHIBIT-AND circuit 76.

Each of the delay circuits 79 and 81 consists of an electronic delay circuit, such as a lumped-constants transmission line, which emits a signal similar to the applied signal but with a time delay. In the present circuits, and in all of the other delay circuits of this specification, the amount of delay is equal to exactly one period of the clock pulse train and is denoted by the numeral "1" in the symbol denoting the delay circuit.

The subcircuit comprising inverter amplifier 73, INHIBIT-AND circuits 76 and 78, and delay circuits 79 and 81, constitutes a dynamic detector to indicate whether, when the zone 1 brush 14 crosses a boundary, the crossing is from an insulating to a conducting segment, termed a 01 transition, or from a conducting to an insulating segment, termed a 10 transition. This statement is true in either forward or backward motion of the code cylinder, but the code cylinder must have motion.

In the operation of this subcircuit, assume a position of brush 14 on the first conducting segment of zone 1, between boundaries 24 and 28. A train of pulses is continuously applied to inverter amplifier 73 and through it and conductor 74 to INHIBIT-AND circuit 76. However, a train of inverted pulses delayed by exactly one period and therefore exactly in phase with the uninverted pulses is applied from delay circuit 81 to the inhibiting input 82 of INHIBIT-AND circuit 76, inhibiting transmission and preventing output. Also, delayed pulses from delay circuit 79 applied to the activating input of INHIBIT-AND circuit 78 are coincident with undelayed inverted pulses applied to the inhibiting input 77, the latter preventing any output from INHIBIT-AND circuit 78.

Now assume forward motion of the code cylinder, causing a transition by brush 14 of boundary 28. An instant before the transition a pulse is applied to delay circuit 79. One microsecond later, and after the transition has occurred, no inhibit pulse exists at conductor 77 but the delayed pulse from delay circuit 79 reaches INHIBIT-AND circuit 78, causing a single pulse output at conductor 83.

Similarly, in backward motion of the code cylinder, when the brush 14 passes from a conducting segment to an insulating segment as, for example, at boundary 24, again a delayed pulse from delay circuit 79 is transmitted through INHIBIT-AND circuit 78 and appears as a single pulse output in conductor 83.

A similar analysis will make it apparent that, in either forward or backward rotation, transition of brush 14 from an insulating to a conducting segment results in a single pulse being produced by the INHIBIT-AND circuit 76 in its output conductor 84.

To summarize, in either forward or backward rotation, at the time of a zone-1 transition a single pulse in conductor 83 denotes the 10 type of transition and a single pulse in conductor 84 denotes the 01 type of transition.

To generate signals indicating whether the zone-1 transition is a critical or non-critical transition, the 01 and 10 transition signals are combined with the asymmetry signals from the second-zone brushes 19 and 21, for these zone-2 signals occur only during critical zone-1 transitions. The combinations are effected in a 3-input AND circuit 86 and in a 3-input INHIBIT-AND circuit 87. The produced signals are of two kinds, one being generated in forward rotation and the other in backward rotation and are used to signal the direction of rotation.

*Initiation of F Signal*

Assume that the code cylinder is rotating in the forward direction and boundary 29 is being crossed. It will be assumed at this time, and later shown, that the activating input conductor 88 carries a pulse train and that the inhibiting input conductor 98 is not energized. This being the case, a single 10 pulse output in conductor 83 is transmitted through an inverter amplifier 91 and applied to AND circuit 86. At the same time an A signal train is applied from conductor 71 to circuit 86 and, therefore, a single pulse output is emitted on conductor 92. By reference to the pattern 11 it is seen that coincidence of the 10 single-pulse zone-1 signal and the A signal train can occur only in forward rotation of the code wheel. Thus the single pulse in conductor 92 denotes forward rotation.

The single pulse in conductor 92 is converted into a pulse train by means of an OR circuit 94, INHIBIT-AND circuit 96, and delay circuit 97. This conversion is effected as follows. The single pulse in conductor 92 is applied through OR circuit 94 to the delay circuit 97, and one period later is applied to the INHIBIT-AND circuit 96. In the presence of a pulse train in conductor 88 and the absence of a pulse or train of pulses in inhibit conductor 98, both of which have been assumed, the pulse delivered to the INHIBIT-AND circuit 96 from the delay circuit 97 passes through to OR circuit 94 and again to delay circuit 97. Thus the pulse continues to circulate, constituting a train of pulses evident in conductor 37 at a frequency of substantially one m.c.p.s. Obviously, in order to prevent this train from being damped out a source of power must be assumed, as in all logic circuit descriptions employing schematic diagrams. The presence of this pulse train denotes forward rotation but, as will be shown later, this train does not exist continuously during forward rotation.

*Initiation of B Signal*

Similar analysis will make it apparent that a single pulse output in conductor 93 from INHIBIT-AND circuit 87 is coincident in time with a zone-1 critical transition and can occur only during backward rotation. A pulse here thus denotes backward rotation. Such a pulse in conductor 93 is employed to trigger a train-generating circuit consisting of OR circuit 99, delay circuit 101, and INHIBIT-AND circuit 102. Absence of inhibiting signals in conductors 89, 103, and 104 is assumed. The resulting train in conductor 38 denotes backward rotation but does not exist continuously during backward rotation.

*Termination of B and F Signals*

When the zone-1 brush 14 makes a 10 transition, it causes the inverter amplifier 91 to apply an inverted signal through conductor 104 to the INHIBIT-AND circuit 102, thus preventing pulse circulation therethrough and terminating any pulse train which may be carried at the time by conductor 38. Thus, in backward rotation, if the B train in conductor 38 is started when brush 14 enters a conducting segment, it must be terminated as the brush leaves the segment. Actually, the B signal is terminated earlier by another mechanism. The termination by the inhibiting pulse from inverter amplifier 91 is necessary only when, brush 14 having crossed a 01 boundary in backward rotation, the code cylinder direction of motion is reversed before the unique coincidence can take place and the brush recrosses the same boundary in the opposite or forward direction.

Operation of 01 transition pulses through inverter amplifier 106 to inhibit the INHIBIT-AND circuit 96 and terminate F pulse trains in conductor 37 is achieved in a similar manner and in similar situations.

*Zone 1 Forward Readout Initiation*

The readout of the code cylinder zone 1 consists of a continuous train of 1 mc.p.s. pulses at the readout terminal 107, denoting the binary digit 1, substantially during the time of contact of brush 14 with any conducting segment, or of an absence of any signal at terminal 107, denoting the binary digit 0, substantially during the time of passage of the center of brush 14 over a non-conducting segment of zone 1.

A pulse train readout, indicating the digit 1, is initiated, in forward rotation, by the simultaneous application of an S signal train from conductor 63, and of a single pulse from conductor 84, denoting a 01 transition, to AND circuit 108. Such coincidence occurs only in forward rotation. The resulting single output pulse in conductor 109 is applied through an OR circuit 111 to a delay circuit 112, an INHIBIT-AND circuit 113, and back to OR circuit 111, constituting a closed-ring train-generating circuit. Absence of inhibiting signals at conductors 114 and 116 is assumed. Thus, a train of pulses is generated in conductor 117. These pulses are applied through an inverter amplifier 118 to the zone 1 output terminal 107 starting its readout in forward rotation at the first instant of contact of brush 14 with any zone-1 conducting segment.

This operation has several other effects. It initiates readout of all higher zone brushes which are on conducting segments and which are not currently reading out. The initiating pulse in conductor 109 passes through OR circuit 119 and conductor 121 to AND circuit 122, and also continues through OR circuit 123 and conductor 124, FIGS. 1 and 2, dashed conductor 126, FIG. 2, and conductor 127 to AND circuit 128, and further continues through OR circuit 129 and conductor 131 to AND circuit 132 associated with the most significant zone. Each of these AND circuits, 122, 128, and 132, operates as a valve or switch, opened by the commencement of the zone-1 signal and permitting readout of a 1 signal at each higher readout terminal 133, 134, and 136 if the corresponding brush is at the time emitting a pulse train. To illustrate, the second zone brush 16 is connected through conductor 137 to the other input of AND circuit 122. Thus, if the first zone transition 26 is being crossed in the forward direction, the brush 16 is in contact with segment 138 and a pulse train is transmitted through conductor 137 to AND circuit 122 simultaneously with the single pulse in conductor 121. The AND circuit 122, therefore, transmits a single pulse to OR circuit 139. But this OR circuit 139, together with delay circuit 141 and INHIBIT-AND circuit 142, constitutes a train-generating circuit which applies a pulse train through inverter amplifier 143 to readout terminal 133. However, if the zone 1 transition is at boundary 27, brush 16 is on an insulating segment, but brush 17 is on the conducting segment 144. Brush 17 being connected through conductor 146 to AND circuit 128, a pulse train is initiated by similar action at readout terminal 134.

These actions occur as described only in the absence of inhibiting inputs to the INHIBIT-AND circuits 142, 147, and 148, which is normally the case.

This readout initiating action, involving OR circuits 119, 123, and 129, is normally not necessary, for normally readout of a higher zone commences substantially when its brush first makes contact with a conducting segment and the readout train, once started, is continued during brush contact by the action of the train-generating circuit such as that involving components 139, 141, and 142. However, if for any reason, after such beginning, the readout should be interrupted, for example, by power failure, the described action started by the zone-1 readout initiation will restart readouts in higher zones.

Although this action has been described for a 4-zone code cylinder with four associated circuit sections, similar action will take place when a code wheel or cylinder of any number of zones and associated circuits is employed, except that the method of sensing motion direction described herein requires no less than two zones. This, however, is no limitation because with only one zone present there would be no problem of unambiguous readout. The dashed lines 126, 149, 151, 152, and 153 indicate that additional logic circuits similar to those associated with the third zone are to be inserted here when a code cylinder of more than four zones is employed.

The resolution of the method described is the one-unit length of a zone-1 segment. That means that the lost motion error which may be incurred at the beginning of the motion and at every reversal of its direction is at most that of the length of one segment of zone 1.

Another result of the presence of a readout pulse train at zone-1 terminal 107 is the prevention of the start of a B signal train as, for example, if the zone-1 brush 14 leaves a conducting segment in forward motion and reenters it almost immediately due to a reversal of the direction of motion taking place before the unique coincidence, in the forward direction, can take place and discontinue the zone-1 terminal readout. The emission through inverter amplifier 118 of a zone-1 readout train applies, through conductor 89, an inverted train to the inhibiting input of INHIBIT-AND circuit 87, preventing initiation of a B train. The same inverted train is also applied to the inhibiting input 103 of the INHIBIT-AND circuit 102, stopping any train which is being maintained by units 99, 101, and 102, thus terminating the B signal train, if it exists.

The zone-1 readout pulse train also applies a signal train to conductor 88, permitting initiation of the F signal train at critical forward transitions such as transitions 28 and 29.

*Zone 1 Forward Readout Termination*

The pattern 11 shows that, in forward motion, termination of a zone-1 readout pulse train always occurs at a critical boundary and therefore is always coincident with a 01 change of the most signficant affected zone, with one exception to be described later. It is this 01 change which normally terminates the zone-1 readout. For example, if the termination of readout is at boundary 28, the most significant affected zone is zone 2. This zone transition produces, through brush 16 and conductor 137, inverter amplifier 154 and components 156 and 157, a 01 pulse in conductor 158 and, through inverter amplifier 159, in conductor 161. Assuming no inhibiting signals at conductors 162 and 163, a pulse train is generated by components 164, 166, and 167 and applied to INHIBIT-AND circuit 168. At about this time, as previously described, an F signal train exists in conductor 37, so that circuit 168 emits a signal train. This signal train is applied through delay circuit 170, conductor 169, OR circuit 171, inverter amplifier 172, and conductor 116 to inhibit the INHIBIT-AND circuit 113, terminating the zone-1 readout pulse train.

In connection with this action it is important to note that the two signals caused by the brushes crossing boundaries 28 and 36 need not be exactly coincident even though the air conjunction has been given the term "unique coincidence." Each triggers a train generator and the train which is first initiated persists until the other train is initiated. Thus, ambiguity or failure due to inexact concidence of the two transitions is eliminated. It is also important to note that cooperation between only two trains is required, that initiated by the least significant zone brush as a motion-sensing train and that initiated by the most significant affected zone brush. In this case, zone 2 is the most significant affected zone, but even if, for example, the most significant affected zone were the eighth zone, cooperation of only the first and eighth zone brush trains would be necessary, and the presence or absence of signals from the second to seventh zone brushes, except the two zone-2 motion-sensing brush signals, and from all brushes above the eighth zone, would be immaterial and would not affect the operation.

It may additionally be noted that in this cooperation of the first zone brush with the brush of the most significant affected zone it is the direction-sensing function of the first zone brush which is involved. Therefore, if some other direction-sensing scheme be employed not utilizing the first zone brush, then only the brush of the most significant affected zone functions, with that sensing scheme, to terminate the zone-1 forward readout.

The zone-1 forward readout termination by a 01 pulse obtained from the most significant affected zone has the additional effects of terminating readouts of all intermediate zones. Reference to the pattern 11 shows that all intermediate zone boundaries are of the 10 type and that, therefore, their readouts should be terminated. This is effected as follows: If, for example, zone 4 is the most significant affected zone, the readout termination signal is passed through OR circuits 177, 179, 171, inverter amplifier 172, and INHIBIT-AND circuit 113, terminating the zone-1 readout. But this signal also passes through inverter amplifier 181 to INHIBIT-AND circuit 147 to terminate the zone-3 readout, and through inverter amplifier 172 to INHIBIT-AND circuit 142, terminating the zone-2 readout. Thus, this same signal from the most significant affected zone terminates all intermediate zone readouts irrespective of their brush contact situations.

In this action of zone 4, the readout signal at terminal 136 is initiated by the passage of the 01 signal and the F signal through INHIBIT-AND circuit 176 and delay circuit 175 to OR circuit 213. However, since, as has just been described, this same resultant signal is transmitted through OR circuit 177, it might be thought that transmission through inverter amplifier 178 to INHIBIT-AND circuit 148 would prohibit the circulation of the initiating pulse in the train generator 213/217/148 and prevent initiation of the zone-4 readout. This inhibiting does not occur for the following reason. At the termination of the F signal, in a manner to be described, and the simultaneous appearance of an inhibiting pulse from inverter amplifier 165, at INHIBIT-AND circuit 176, the pulse train applied to both OR circuit 213 and OR circuit 177 is terminated starting with the second pulse of this train. The first and only pulse of this terminated train, passing through OR circuit 177 and inverter amplifier 178, does indeed inhibit the INHIBIT-AND circuit 148. But simultaneously the same pulse transmitted through OR circuit 213 passes to delay circuit 217, where it is stored for one pulse period, and then passes on to INHIBIT-AND circuit 148. But by that time the inhibiting pulse has disappeared from input conductor 185, and the stored pulse is therefore free to initiate the pulse train in the train generator 213/217/148.

The action terminating the F signal is as follows. When in forward rotation the zone-1 readout is terminated as has just been described, cessation of the readout signal through the inverter amplifier 118 terminates the signal train in conductor 88. This terminates the conductivity of INHIBIT-AND circuit 96, thus terminating the action of the F train generator 94/96/97.

*Zone 2 Forward Readout Initiation*

The initiation of the most significant affected zone readout has just been briefly described. It will be described more explicitly for the case in which zone 2 is the most significant affected zone, boundaries 28 and 36 being in transit in the forward direction. As before described, a signal train is generated by INHIBIT-AND circuit 168, whose first pulse, after a one-clock-period delay in delay circuit 170, through conductor 169, OR circuit 171, inverter amplifier 172, and conductor 116, extinguishes the zone-1 readout signal. The same signal also initiates the zone-2 readout signal by passing from conductor 169 to OR circuit 139. It is delayed in delay circuit 141 for one clock period, during which the inhibiting effect of the pulse in conductor 116' disappears, and elements 139, 141, and 142 generate the readout train. As was described in connection with the zone-1 forward readout termination, it is the first pulse of the pulse train from INHIBIT-AND circuit 168 which, in starting the zone-2 terminal readout, also terminates, through inverter amplifier 143, this pulse train just generated in the train-generating circuit 164/166/167, starting with its second pulse. Thus, no further inhibiting pulses appear through conductor 166' at INHIBIT-AND circuit 142, and the pulse train generated by the train-generating circuit 139/141/142 is permitted to continue. This train is transmitted through inverter amplifier 143 to the zone-2 readout terminal 133.

*Zone 2 Forward Readout Termination*

This action is similar to the zone-1 forward readout termination. If, for example, in the forward motion brush 16 should come to boundary 33, the most significant affected zone is zone 4 and brush 18 thereof coincidentally comes to boundary 31. Zone 4 being the most significant affected zone, a 01 pulse is generated in conductor 173, converted to a train in conductor 174, and applied to the INHIBIT-AND circuit 176. An F train exists in conductor 37 so that INHIBIT-AND circuit 176 starts to apply a pulse train through delay circuit 175 to the OR circuit 177. The first pulse of this train passes through inverter amplifier 178, OR circuit 179, inverter amplifier 181, dashed conductor 151, conductor 180, OR circuit 171, and inverter amplifier 172 to inhibit the INHIBIT-AND circuit 142 and terminate the zone-2 readout train. The continuation of the pulse train from INHIBIT-AND circuit 176 is prevented in the same manner as was described earlier in connection with the zone-1 forward readout termination.

*Zone 1 Backward Readout Initiation*

At boundary 29, for example, in backward rotation, the conjunction of a 01 signal pulse from brush 14 of zone 1 and an A signal train produces a pulse in conductor 93, starting the B signal train in conductor 38. At the same time the most significant affected zone, in this case zone 3, has, it is assumed, been emitting a signal through inverter amplifier 182 to its output terminal 134, to INHIBIT-AND circuit 183, and to AND circuit 184. At this time the zone 3 brush 17 leaves the conducting segment 144, making a 10 transition. The resulting 10 pulse passes through inverter amplifier 186 to OR circuit 187, there initiating a pulse train, and on to AND circuit 184. Initiation of a backward signal train by the combination of a zone-1, 01 signal and an asymmetry signal has been described. Such a signal train exists at this time, or is initiated shortly after initiation of the pulse train by train generator 236. Therefore, all three input signal trains to AND circuit 184 exist, and this circuit emits a signal train. The first pulse of this train passes, after a delay of one-clock-period in delay circuit 155, through OR circuit 188, inverter amplifier 189, dashed conductor 149, conductor 190, OR circuit 191, and inverter amplifier 192 to OR circuit 111, starting the zone-1 readout train. It also starts all intervening zone readout trains, in this case zone-2 readout train, through OR circuit 139, and through conductor 193 inhibits and stops the zone-3 readout train.

It would seem that, at the same time that the zone-2 readout train is started through conductor 190 and OR cirucit 139, the train generator 139/141/142 would also be inhibited by a pulse applied through conductor 190, OR circuit 191, and inverter amplifier 192 to INHIBIT-AND circuit 142. This is, however, not the case, for at the termination of the emission of AND circuit 184 the first and only pulse of its train is applied in zone 2 both to OR circuit 139 and, through OR circuit 191 and inverter amplifier 192, to INHIBIT-AND circuit 142. But the emission of OR circuit 139, being delayed in delay circuit 141, arrives at INHIBIT-AND circuit 142 after the inhibiting pulse applied at input 195 has decayed. This pulse therefore initiates the generation of a train by the train generator 139/141/142.

The termination of the emission of AND circuit 184 just mentioned is caused by the termination of pulse trains particularly at inputs 200 and 38'. The input at 200 is self-terminating as follows. The output pulse in conductor 205 passes through delay circuit 155, OR circuit 188 and inverter amplifier 189 to inhibit INHIBIT-AND circuit 147 and terminate the zone-3 pulses in conductor 200. But this terminates one input to AND circuit 184, preventing further emission by it.

The input at conductor 38' is the B pulse train, which is terminated by the starting of the zone 1 signal as follows. At the start of the zone 1 signal, inverter amplifier 118 initiates an inverted pulse train in conductor 89 which inhibits the INHIBIT-AND circuit 102, terminating the B train generated by B train generator 99/101/102.

Each of the two effects just described terminates the train started by the train-generating circuit 236. Thus, all input signal trains are removed at once from AND circuit 184 due to the action of the first pulse emitted by this circuit, and no further pulse is forthcoming from it.

*Zone 1 Backward Readout Termination*

In backward rotation when the zone 1 brush 14 leaves a conducting segment a 10 pulse is generated in conductor 83 and coincidentally an S signal train due to brushes 19 and 21 exist in conductor 63. Therefore, AND circuit 194 emits a pulse in conductor 196. This pulse, through inverter amplifier 197, inhibits INHIBIT-AND circuit 113 and stops the zone-1 readout train.

This action has the additional consequence that it initiates readouts of all higher zones whose brushes are on conducting segments and which, because of power interruption or other reason, have had their readouts interrupted. The pulse in conductor 196 is transmitted through OR circuits 119, 123, and 129, and through AND circuits 122, 128, and 132, respectively. The pulse in conductor 196, therefore, permits readouts in those zones which are applying brush readout signal trains to the same AND circuits.

*Zone 2 Backward Readout Initiation*

In the backward motion readout initiation of zone 2, that zone is never the most significant affected zone. The action of the latter, in initiating the zone-1 readout, also initiates the zone-2 readout as described above.

*Zone 2 Backward Readout Termination*

Whenever the readout of zone 2 in backward motion is terminated, zone 2 is the most significant affected zone and the operation is exactly as described above for the zone-3 readout signal termination under "zone-1 backward readout initiation."

*Most Significant Zone*

The four-zone code cylinder or wheel of this example, or, generalized, a single code device of any number of zones, may or may not be geared to one or more other code devices carrying higher zones. But in any case there is a most significant zone. This, such as zone 4 in this example, has two boundaries, 31 and 13. The boundary 31 is a unique boundary and the circuits as so far described adequately cover operations in crossing this boundary. However, the boundary at line 13/12 is not unique, for the transition is of the same kind as those of all other zones, so that special circuitry is demanded. This circuitry comprises INHIBIT-AND circuit 198, and AND circuit 199. Inspection of pattern 11 shows that operations involving this boundary 13/12 consist only of the most significant zone forward readout termination and backward readout initiation.

*Most Significant Zone Forward Readout Termination*

In forward operation, when the zone 4 brush 18 arrives at the boundary 13/12, a 10 pulse is generated in conductor 201 and applied through inverter amplifier 202 to OR circuit 203. At the same time, since the zone-4 brush has been on a conducting segment, a readout train exists at terminal 136 and is applied through conductor 204 to INHIBIT-AND circuit 206 and both AND circuits 207 and 199. A pulse train is therefore initiated in components 203, 206, and 208 and is applied to the AND circuits 207 and 199. At the same time an F train is initiated by the actions of the zone 1 and 2 brushes, as heretofore described, in conductor 37. This F train is applied through conductor 37' to AND circuit 199, which accordingly starts to emit a pulse train. The first pulse of this pulse train passes through delay circuit 210, OR circuit 177, and inverter amplifier 178 to INHIBIT-AND circuit 148, terminating the zone-4 readout. It also passes through inverter amplifier 178 and conductor 209 to OR circuit 179, inverter amplifier 181, and INHIBIT-AND circuit 147, through conductors 151 and 180 to OR circuit 171, inverter amplifier 172, and INHIBIT-AND circuit 142, and through conductor 116 to INHIBIT-AND circuit 113, terminating the readouts of all lower zones. Thus in forward rotation, at boundary 13/12 all zones are brought to zero readout. The continuation of the emission of the pulse train by AND circuit 199 is prevented, starting with the second pulse of this train, by the termination of the zone-4 readout signal train in conductor 204.

*Most Significant Zone Backward Readout Initiation*

In backward rotation, when the zone-4 brush 18 arrives at boundary 13/12, a 01 pulse is generated in conductor 173 and transmitted through inverter amplifier 211 to OR circuit 212, and a pulse train is initiated in conductor 174 and is applied to the INHIBIT-AND circuits 176 and 198. At about the same time, as before described, operation of the zone 1 and 2 brushes initiates the B signal in conductor 38'. Since at this time zone 4 has no readout signal at terminal 136, circuit 198 is not inhibited and starts to emit a pulse train. The first pulse of this train is applied after a delay of one clock period in delay circuit 215, to OR circuit 213, initiating the zone-4 output. Although this pulse is simultaneously applied through OR circuit 214 and inverter amplifier 216 to inhibit the INHIBIT-AND circuit 148, the storage in delay circuit 217 causes this first and, as will be seen, final pulse from INHIBIT-AND circuit 198 to persist after the inhibiting action has been removed, so that the zone-4 output train generation continues. The initiation of the zone-4 readout signal is accompanied by the appliaction of an inverted signal from inverter amplifier 165 to the INHIBIT-AND circuit 220, terminating the train generation through OR circuit 212 with the second pulse of this train. Thus, the first pulse of this train remains the only pulse, as was indicated above.

Initiation of the zone-4 readout train is acompanied by initiation of a readout signal from every lower zone by a signal transmitted through OR circuit 214, inverter amplifier 216, and conductor 218 to OR circuit 219; through OR circuit 188, inverter amplifier 189, and conductors 221, 149, and 190 to OR circuit 139; and through OR circuit 191, inverter amplifier 192, and conductor 222 to OR circuit 111.

*Summary*

These several detailed descriptions of initiations and terminations of readouts from the several zones can all be generalized as follows. In the case of any and all readout initiations and terminations, it is the function of only one pickup brush alone, that of the most significant affected zone, in cooperation with a motion-sensing device, to effect the initiation or termination of readout of its own zone and simultaneously of all lower zones.

Under "Zone 1 Forward Readout Initiation" a description was given of several other effects, in particular of the simultaneous readout of all higher zone brushes not affected by the particular change. Whatever the reading of such a higher zone brush, its readout is reinforced at the time of any transition of zone 1, and the above description generally applies to this operation except that it is the action of the most significant affected zone in all cases which effects this reinforcement.

*Unnecessary and Improper Signals*

There are several different ways in which the brush pickups can emit unnecessary or improper signals, but in every case the circuits which have been described prevent erroneous readout indications at the instrument output terminals 107, 133, 134, and 136. In general, any readout signal at these terminals is generated solely by the pickup signals from the zone-1 brush and from the most significant affected zone brush, always of course in association with signals from the motion-sensing brushes as well. The intermediate zone pickup brushes never play any part in generating any readout indications at the instrument output terminals, as has been described. For example, in the pattern 11 at boundary 29' the signals emitted by the zone-2 brush 16 play no part whatever in producing the instrument output signal at zone-2 output terminal 133 and, in the transit of this boundary in either forward or backward direction, the brush signals are completely unnecessary. This is also true for the brush signals of any other intermediate zone or zones. Thus, eliminating the use of intermediate brush signals eliminates ambiguity.

By improper signal is meant a pickup signal change in the presence of an output terminal readout signal of the wrong kind. It must be kept in mind that a certain time elapses between a brush signal change and the instrument output terminal readout change caused by the transition. For example, in forward operation across boundary 29 a change in the zone-1 brush 14 signal from 1 to 0 is proper while the output terminal 107 emits a 1 signal. It would be improper, but conceivably possible, if during a 1 signal emission at terminal 107 the brush signal change should be from 0 to 1, or if at this boundary when the brush signal changes from 1 to 0 the output signal at terminal 107 is of the 0 kind, that is, constitutes absence of a pulse train.

An improper signal may be given by any zone brush due to reversal of motion direction after only one, but not both, of the brush signals of the least significant zone and most significant affected zone has been emitted and before the other signal could be emitted and the proper change of signals at the instrument output terminals be effected. Improper signals may also arise due to chattering contact of any brush as it crosses a boundary, perhaps causing a number of alternate makes and breaks in succession instead of a single make or break. In the case of an intermediate brush, a change which is in the right direction but which occurs after the corresponding change of signal at its instrument output terminal, becomes an improper change and its emitted signal an improper signal.

Since similar provisions have been made in the circuits to prevent forward and backward motion misoperations, it will be sufficient to describe the circuit arrangemenst for only one direction of motion. Since all intermediate zone circuits are similar and functionally identical, descriptions including zones 1, 2, and 3 cover substantially all cases.

Consider the production of a brush signal at the boundary 29' in the intermediate zone 2 by brush 16 when the boundary is being crossed in the forward direction. The 10 change produces a signal in conductor 137 which passes through inverter amplifier 154 and INHIBIT-AND circuit 223 to produce a pulse in conductor 224 representing the 10 change. This pulse initiates a pulse train in conductor 226 which, however, gets no farther than AND circuit 227, since there is no backward signal in conductor 38 which signal is necessary in order for the AND circuit 227 to conduct. Similarly, in backward operation of the code cylinder across boundary 29', the 01 pulse train cannot pass through INHIBIT-AND circuit 168 in the absence of an F signal in conductor 37. These normal zone 2 signals are thus unnecessary and are not utilized. These unnecessary signals are not permitted to exist beyond the time when the zone-2 readout signal is actually changed due to the combined actions of the signals from the least significant zone and the most significant affected zone brushes. The first of the two described unnecessary signals is discontinued with the disappearance of the zone-2 readout pulse train from INHIBIT-AND circuit 225, the second, with the appareance of the inverted zone-2 readout pulse train at INHIBIT-AND circuit 167.

Abnormal signals generated at brush 16 are eliminated in the same way either at circuit 167 or at circuit 225. These abnormal or improper signals emitted by the intermediate zone brush include signals generated at boundary 29' when the zone-2 brush crosses this boundary after only one of the zone 1 and 3 brushes has crossed its boundary, and recrosses it due to a reversal in motion direction taking place before the other brush could cross its boundary, or when the zone-2 brush crosses this boundary well after both of the zone 1 and 3 brushes have crossed their respective boundaries and have caused all output terminal signals involved to change. Also, improper signals caused by chattering and intermittent contacting of brush 16 before, during, or after the circuit operations consequent upon zone 1 and 3 transitions are eliminated in the same manner.

If, in forward rotation, the zone-3 brush 17 makes contact with segment 144 and chatters, opening and closing its circuit several times, before the zone-1 brush 14 crosses its boundary 29, no misoperation is caused. At the first zone 3 change of 01, a pulse indicating this change is generated in the conductor 228 and initiates a pulse train in conductor 229. However, as no forward (F) signal exists at this time, the zone-3 signal gets no farther than the INHIBIT-AND circuit 231.

If the zone-3 contact chatters, so that the 01 signal is followed by a 10 signal, the zone-1 brush still not having left its conducting segment, the 10 pulse in conductor 232 generates a single pulse in conductor 233 which gets no farther than AND circuit 184, there being no backward (B) signal nor a zone-3 output terminal signal. This pulse cannot develop into a pulse train in train-generating circuit 236 because of the absence of the necessary zone-3 output terminal signal at INHIBIT-AND circuit 183. In addition, an inverse signal from inverter amplifier 186 terminates the action of the train generator 234.

Similarly, in backward rotation, if the zone-3 brush 17 loses contact with segment 144 before the zone-1 brush 14 crosses the boundary 29 and chatters, a pulse train, generated by the first 10 pulse in the train-generating circuit 236, cannot pass through the AND circuit 184 due to the absence of the B signal input. This pulse train is terminated by the first 01 pulse in conductor 228 after its inversion by inverter amplifier 237. The single 01 pulse itself cannot develop into a pulse train in the train-generating circuit 234, nor can it pass through the INHIBIT-AND circuit 231, both due to the presence of the inverted zone-3 output terminal readout signal.

If the zone-1 brush 14 contact should chatter, making intermittent contact, three cases may be distinguished depending on whether the chatter takes place before the zone-3 transition, during action dependent thereon, or after this action. If, before the zone 3 change, the zone-1 brush 14 crosses boundary 29 in the forward direction, initiating a 10 pulse and an F signal train, then emits a 01 change signal, the latter, through inverter amplifier 106, terminates the F signal train, but does not pass through the INHIBIT-AND circuit 87 due to the inhibiting action of the zone-1 output terminal signal train. A following zone 1 10 signal then again initiates the F signal in conductor 37.

If this zone 1 chatter occurs after the zone 3 01 change, but during the one-cycle period before the signal in conductor 88 is extinguished, the action is as described. If, however, the chatter occurs after the zone 3 01 change and after it has extinguished the output signal in terminal 107, the 01 and 10 signals successively originating at brush 14 do no harm and have no effect as the final 10 signal through conductor 104 extinguishes the B signal train started by the preceding 01 signal pulse and is itself extinguished at AND circuit 86 in the absence of a signal in conductor 88. In backward rotation, the roles of the two chatter-produced signals are analogous and can be established by similar reasoning.

What is claimed is:

1. An analog to digital converter comprising, a code translator bearing natural binary code thereon in alternate binary representations of digital numerals in a plurality of zones of increasing digital significance, a readout device associated with each of said zones producing signals representative of the two binary digital numerals in accordance with the particular representations of the zone read out thereby, means for producing relative motion between said code translator and said readout devices, means for producing a pair of direction-indication signals one of which is indicative of relative motion between said code translator and readout devices in one direction and the other of which is indicative of such relative motion in the opposite direction, and means operated by a signal from said last-mentioned means and by a coincident signal from one said readout device for establishing the values of all of a plurality of parallel binary output signals.

2. An analog to digital converter comprising, a code translator bearing natural binary code thereon in alternate 1 and 0 binary representations in a plurality of zones of increasing digital significance, a readout device associated with each of said zones producing signals representative of the binary digits 1 or 0 in accordance with the particular indicia of the zone read out thereby, means for producing relative motion between said code translator and said readout devices, means for producing a pair of direction-indication signals one of which is indicative of relative motion between said code translator and readout devices in one direction and the other of which is indicative of such relative motion in the opposite direction, and means operated by said direction-indication signals and the signal read out from that zone of said translator whose change of binary digital value by reason of the relative motion of said translator and said readout devices is opposite to the change of digital value of all signals read out by the readout devices associated with all zones of lesser significance for establishing the binary values of all of a plurality of parallel binary output signals.

3. An analog to digital converter comprising, a code translator bearing natural binary code thereon in alternate 1 and 0 binary representations in a plurality of zones of increasing digital significance, a readout device associated with each of said zones producing signals representative of the binary digits 1 or 0 in accordance with the particular representations of the zone read out thereby, means for producing relative motion between said code translator and said readout devices whereby when a readout device crosses a boundary between a pair of alternate representations the readout signal thereof undergoes a transition from one to the other of said representative signals, means for producing a pair of direction-indication signals one of which is indicative of relative motion between said code translator and readout devices in one direction and the other of which is indicative of relative motion in the opposite direction, and means operated when said readout devices cross boundaries approximately coincidentally in a continuous series of one or more zones beginning with the least significant zone, said last means being operated by one of said pair of direction-indication signals in coincidence with a signal representing the boundary crossing of a single readout device of said series of zones for estab- the values of all of a plurality of parallel binary output signals.

4. An analog to digital converter comprising, a code translator bearing natural binary code indicia thereon in alternate 1 and 0 binary representations separated by boundaries in each of a plurality of zones of increasing digital significance, a readout device associated with each of said zones producing signals representative of the binary digits 1 or 0 in accordance with the particular representations of the zone read out thereby, means for producing relative motion between said code translator and all of said readout devices as a group whereby the transition of a boundary by a readout device changes the signal produced thereby from one to the other of said representative signals, said readout devices being so positioned with respect to said code representations that a change in signal produced in a readout device associated with any one zone is always accompanied by a change in signal in the readout devices associated with all zones of lesser significance, means including one readout device and a pair of motion sensing devices associated with the zone next more significant than that with which said last mentioned readout device is associated producing a pair of direction-indication signals, one of said direction-indication signals being indicative of relative motion between said core translator and said group of readout devices in one direction, means operated by the coincidence of one of said pair of direction-indication signals and the readout signal of the readout device associated with the most significant of the zones in which signal change occurs for initiating and establishing the values of a plurality of parallel binary output signals representing the readouts of said zones in which signal change occurs, and means additionally operated thereby for producing indications in the form of parallel binary output signals of all other zones of said code translator.

5. An analog to digital converter in accordance with claim 4 in which said means for producing a pair of direction-indication signals includes a single said readout device associated with said least significant zone.

6. An analog to digital converter comprising, a code translator bearing natural binary code representations thereon in alternate 1 and 0 binary areas separated by boundaries in a plurality of zones of increasing digital significance, a single readout device per zone each associated with a respective one of said zones, an additional pair of sensing devices positioned on either side of the single readout device associated with the next to least significant zone, said additional pair of sensing devices together with the single readout device associated with the least significant zone constituting motion-sensing readout devices, all of said readout devices producing readout signals representative of the binary digits 1 or 0 in accordance with the representations of the associated zones, means for producing relative motion between said code translator and all of said readout devices as a group whereby the transition of any boundary by any readout device changes the signal produced thereby from one to the other of said representative signals, said readout devices being so positioned with respect to said code representations that a change in signal produced in a readout device associated with any one zone is always accompanied by a change in signal in the readout devices associated with all zones of lesser significance, means including said motion-sensing readout devices for producing a pair of direction-indication signals in respective ones of a pair of conductors, one of said pair of signals in one of said pair of conductors being indicative of relative motion between said code translator and said group of readout devices in one direction and the other of said pair of signals in the other of said pair of conductors being indicative of relative motion in the opposite direction, a plurality of parallel binary output terminals, and an AND circuit operated by the coincidence of one of said pair of direction signals and the signal produced by the readout device associated with the most significant of the zones in which signal change occurs for producing an executing signal, means operated by said executing signal for changing the signals in the binary output terminals representing the readouts of said most significant zone in which signal change occurs and all less significant zones, and means operated by said excuting signal for repeating the output signals at the output terminals representing readout devices associated with all other zones.

7. An analog to digital converter comprising, a code translator bearing natural binary code representations thereon in alternate 1 and 0 binary areas separated by boundaries in a plurality of zones of increasing digital significance, a single readout device per zone each associated with a respective one of said zones, an additional pair of sensing devices positioned on either side of the single readout device associated with the next to least significant zone, said additional pair of sensing devices together with the single readout device associated with the least significant zone constituting motion-sensing readout devices, all of said readout devices producing readout signals representative of the binary digits 1 or 0 in accordance with the representations of the associated zones, means for producing relative motion between said code translator and all of said readout devices as a group whereby the transition of any boundary by any readout device changes the signal produced thereby from one to the other of said representative signals, said readout devices being so positioned with respect to said code representations that a change in signal produced in a readout device associated with any one zone is always accompanied by a change in signal in the readout devices associated with all zones of lesser significance, means including said motion-sensing readout devices for producing a pair of direction-indication signals in respective ones of a pair of conductors, one of said pair of signals in one of said pair of conductors being indicative of relative motion between said code translator and said group of readout devices in one direction and the other of said pair of signals in the other of said pair of conductors being indicative of relative motion in the opposite direction, a plurality of parallel binary output terminals, and an AND circuit operated by the coincidence of one of said pair of direction signals and the signal produced by the readout device associated with the most significant of the zones in which signal change occurs for producing an executing signal, means operated by said executing signal for changing the signals in the binary output terminals representing the readouts of said most significant zone in which signal change occurs and all less significant zones, and means operated by said executing signal for repeating the output signals at the output terminals representing readout devices associated with all other zones, and means including an AND circuit and an INHIBIT-AND circuit to produce said output changes when the most significant zones which produces a signal change in its associated readout device is the highest order zone and the signal change thereof is of the same kind as that produced in the readout devices associated with all zones of lesser significance.

References Cited in the file of this patent

UNITED STATES PATENTS

| | | |
|---|---|---|
| 2,733,430 | Steele | Jan. 31, 1956 |
| 2,750,584 | Goldfischer | June 12, 1956 |
| 2,873,440 | Speller | Feb. 10, 1959 |
| 2,898,040 | Steele | Aug. 4, 1959 |